US006762238B1

(12) United States Patent  (10) Patent No.: US 6,762,238 B1
Yang et al.  (45) Date of Patent: Jul. 13, 2004

(54) WATER-BORNE POLYMERIC COMPLEX AND ANTI-CORROSIVE COMPOSITION

(75) Inventors: Sze Cheng Yang, Wakefield, RI (US); Richard Brown, Wakefield, RI (US)

(73) Assignee: The Board of Governors for Higher Education, State of Rhode Island and Providence Plantations, Providence, RI (US)

( * ) Notice: Subject to any disclaimer, the term of this patent is extended or adjusted under 35 U.S.C. 154(b) by 0 days.

(21) Appl. No.: 09/856,935

(22) PCT Filed: Dec. 1, 1999

(86) PCT No.: PCT/US99/28307

§ 371 (c)(1),
(2), (4) Date: Aug. 31, 2001

(87) PCT Pub. No.: WO00/32844

PCT Pub. Date: Jun. 8, 2000

(51) Int. Cl.[7] .................................................. C08K 3/00
(52) U.S. Cl. ........................ 524/543; 524/457; 524/458; 524/460; 524/461; 524/547; 524/548; 524/550; 524/555; 524/556
(58) Field of Search ................................. 524/457, 458, 524/460, 461, 543, 547, 548, 550, 555, 556

(56) References Cited

U.S. PATENT DOCUMENTS

| 4,442,185 A | 4/1984 | Skotheim |
| 4,731,408 A | 3/1988 | Jasne |
| 4,933,106 A | 6/1990 | Sakai et al. |
| 4,959,180 A | 9/1990 | Armes et al. |
| 5,186,860 A | 2/1993 | Joyce, Jr. et al. |
| 5,187,034 A | 2/1993 | Otagawa et al. |
| 5,188,783 A | 2/1993 | Pierce |
| 5,215,682 A | 6/1993 | Destryken et al. |
| 5,253,100 A | 10/1993 | Yang et al. |
| 5,290,483 A | 3/1994 | Kulkarni et al. |
| 5,312,681 A | 5/1994 | Mays et al. |
| 5,370,825 A | 12/1994 | Angelopoulos et al. |
| 5,382,382 A | 1/1995 | Asakura et al. |
| 5,489,400 A | 2/1996 | Liu et al. |
| 5,520,852 A | 5/1996 | Ikkala et al. |
| 5,532,025 A | 7/1996 | Kinlen et al. |
| 5,556,518 A | 9/1996 | Kinlen et al. |
| 5,585,038 A | 12/1996 | Kirmanen et al. |
| 5,585,040 A | 12/1996 | Kirmanen et al. |
| 6,010,645 A | 1/2000 | Angelopoulos et al. |
| 6,150,032 A | 11/2000 | Yang et al. |
| 6,656,388 B1 | 12/2003 | Yang et al. |

FOREIGN PATENT DOCUMENTS

| EP | 4957514 A | 8/1992 |
| EP | 0560721 | 9/1993 |
| JP | 63-2157222 | 9/1988 |
| JP | 01-254764 | 10/1989 |
| JP | 02-069525 | 3/1990 |
| JP | 2-160823 | 6/1990 |
| JP | 05-262981 | 10/1993 |
| WO | WO 97/03127 | 1/1997 |

OTHER PUBLICATIONS

Liu et al (Novel Colloidal Polyaniline Fibrils Made by Template Guided Chemical Polymerization), J. Chem Soc. Chem. Comm. Nov. 1991 pp151–153.
Liu et al. (Novel Template Guided Synthesis . . . ), Mat. Res. Soc. Symp. Proc. Vo. 247 (Jan. 1992), pp601–606.
Ahlskog et al., "Heat–Induced transition to the conducting state . . . ", Synthetic Metals, vol. 69, Mar. 1, 1995, pp. 213–215.
Ghosh et al., "Swellability properties of polyelectrolyte complexes . . . ", Synthetic Metals, vol. 60, Sep. 15, 1993, pp. 133–135.
Liu et al., "Novel Template Guided Synthesis of Polyamiline", vol. 247 of Mat. Res. Soc. Symp. Proc., Jan. 1992, pp. 601–606.
Sun et al., "Template Guided Synthesis of Conducting Polymers–Molecular Complexes of Polyamilines and Polyelectrolytes", Polymer Reprints, Aug. 1992, pp. 378–380.

Primary Examiner—Edward J. Cain
(74) Attorney, Agent, or Firm—Gauthier & Connors, LLP (57) ABSTRACT

A coating composition which contains a polymeric complex between polyaniline and a polymeric ion. In addition to the said polymeric complex, the composition contains a water-dispersable binder. The composition is useful as a water-borne paint to be applied onto a metal substrate electrophoretically or non-electrophoretically.

24 Claims, 1 Drawing Sheet

WATER-BORNE POLYMERIC COMPLEX AND ANTI-CORROSIVE COMPOSITION

BACKGROUND OF THE INVENTION

1. Field of the invention

A coating composition which contains a polymeric complex between polyaniline and a polymeric ion. In addition to the said polymeric complex, the compositon contains a water-dispersable binder. The composition is useful as a water-borne paint to be applied onto a metal substrate electrophoretically or non-electrophoretically.

2. Description of Relevant Art

Conductive polymers ($\pi$-conjugated polymers) are potentially useful as a polymeric coating materials to impart special electrical, optical and electroactive properties to coated surfaces. When used as a coating on metals it can impart protection against corrosion of the metals (Wessling DE4334628, Kinlen U.S. Pat. No. 5,532,025). The electrically conductive form of the conducting polymers can also be coated on non-conductive surfaces to render the surfaces electrically conductive. Examples of the $\pi$-conjugated polymers are polyaniline, polypyrrole, polyacetylene, polythiophene etc.

The $\pi$-conjugated polymers are electrically conductive when they are doped by ionic compounds. In the electrically conductive state, the $\pi$-conjugated polymer backbone is a polycation. The positive charge on the $\pi$-conjugated polymer backbone is the mobile charge that leads to electrical conductivity. The dopants are the counter ions that balance the positive charges. The difficulties in using conventional conducting polymers for coatings are associated with two of their properties; (1) they are unstable in their doped state and (2) they lack processability. The reason for the lack of processability comes from the fact that the conducting polymers are $\pi$-conjugated polymers. The delocalized $\pi$ electronic structure leads to a stiff polymer chain and strong inter-chain attraction. Thus, the conventional conducting polymers cannot be easily dissolved, melted or blended with other polymers.

The lack of material stability comes from the fact that the ionic dopants are easily lost or segregated from the $\pi$-conjugated polymers. Examples of the dopants used in the prior art include hydrogen chloride, p-toluene sulfonic acid, 4-dodecylbenzne sulfonic acid, and dinonylnaphthaienedisulphonic acid (Jen et al., U.S. Pat. No. 5,069,820, Dec. 3, 1991; Elsenbaumer, U.S. Pat. No. 5,160,457, Nov. 3, 1992; Cao et al., U.S. Pat. No. 5,232,631, 1993; Kinlen U.S. Pat. No. 5,567,356, Oct. 22, 1996). When these conducting polymers are exposed to heat, water, solvents and/or moisture, these molecular dopants are lost. Once the dopants are lost, the polymer loses its electrical conductivity and its electroactivity. The loss of dopants occurs either during the manufacturing process or during the service life of the coated product. In certain cases, molecular anions with bulky organic groups are used to reduce the rate of loss of the dopant. This only slows down the rate of dopant is loss, it does not eliminate the problem. Even when the dopes are not lost, the electrical conductivity can be lost due to the diffusion of dopants at a microscopic length scale. The detachment of the dopants from the $\pi$-conjugated polymer backbone at a microscopic length scale (0.1 $\mu$m length) leads to dedoping. A microscopic scale phase segregation between the polymer and the dopant is easily promoted by heat or solvent. The molecular dopants tend to segregate from the vicinity of the polymeric chain of the $\pi$-conjugated polymer backbone which results in a loss of the desirable properties.

A problem with the conventional $\pi$-conjugated polymers is that they are brittle, hard and solid. In coating applications, the conventional $\pi$-conjugated polymers do not adhere to the surface of the substrate. Thus the $\pi$-conjugated polymers are blended with an insulating, non-conductive resin to form a mixture that could be adherent to the surface of a substrate. See U.S. Pat. Nos. 5,532,025, 5,543,084 and 5,556,518. When the conducting polymer is imbedded in the matrix of a non-conducting polymer such as an epoxy, polyurethane, polyacrylate or alkyd binders, the rate of dopant loss is reduced in the macroscopic level (e.g 0.1 mm length), but the problem of segregation at a microscopic length scale (e.g. 0.1 $\mu$m length) is not eliminated. The electroactive properties will show signs of degradation over a period of several months. For a number of applications, the material stability is not good enough. In addition to the problem with the service life of coatings or blends of these $\pi$-conjugated polymers, there are problems with the manufacturing process.

The dopants are easily lost during the manufacturing process either because of heat or because of contact with water or polar solvents. For example, U.S. Pat. No. 5,543,084 discloses a method for electrocoating a blend of epoxy and polyaniline. The conductive polymer PANI-PTSA (polyaniline doped by p-toluenesulfonic acid) was mechanically blended in aqueous solution and then electrophoretically coated on metal. From the disclosure it is evident that the anionic dopant of PANI-PTSA was lost before the $\pi$-conjugated polymer was co-deposited with epoxy. A redoping by immersing the coating in camphor sulfonic acid was needed to restore polyaniline to its electrically conductive state. It is expected that the dopants incorporated by redoping will be easily dedoped again by either heat or by exposure to moisture.

Coatings that use undoped polyaniline (emeraldine base) have been disclosed in the literature (McAndrew et al. U.S. Pat. No. 5,441,772, and Epstein et al. U.S. Pat. No. 5,824,371). These $\pi$-conjugated polymers without dopant are nonconductive because there is no charge carrier on the polymer backbone. For most applications it is essential to maintain the $\pi$-conjugated polymers in the electrically conductive state. Thus it is desirable to have an electrically conductive polymer that is both processable and is stable against the loss of dopants.

An alternative to the above mentioned remedies is to synthesize a molecular complex of the $\pi$-conjugated polymer and a polymeric dopant. If the polymeric dopant is strongly bonded to the $\pi$-conjugated polymer the dopant will not be easily lost during the manufacturing process and the service life of the conducting polymer. A method was previously disclosed for synthesizing processable conducting polymers with stable dopants (Liu et al. U.S. Pat. No. 5,489,400). In this disclosure, a template-guided chemical polymerization was used to obtain a polymeric complex that contained a stand of polyaniline and a strand of a polyelectrolyte. The reaction product is a non-covalently bonded molecular complex between a conducting polymer and a polyelectrolyte. The molecular complex contains the two linear chains of the component polymers bonded in a side-by-side fashion. The complex is a double-strand synthetic polymer. When polyaniline is the conductive strand, dsPAN designates the double-strand polyaniline. Compared with the double-strand biopolymer, DNA, the synthetic dsPAN is less ordered in structure and is generally not in a helical conformation. Examples of the polyelectrolytes are poly(styrenesulfonic acid) and poly(acrylic acid). Since the two strands of polymers are bonded strongly, these polymeric complexes are stable and do not dedope easily.

The dsPAN disclosed in this '400 patent is one of three types. The first type is a water-soluble polymeric complex of polyaniline. This type of dsPAN is not suitable for anticorrosion coating applications because a pure dsPAN coating is redissolved in contact with water therefore the coating is lost in rain or humid air. It is conceivable that the water-soluble dsPAN can be incorporated in a polymeric binder that prevents water dissolution of the coating. The hyrophilicity of this type of dsPAN is, however, still a problem for corrosion protection. The coating will absorb moisture or swell in water and thus reduce the adhesion of binder to the metal substrate.

A second type of dsPAN disclosed was an insoluble solid that precipitates from the aqueous reaction medium. This type of dsPAN can only be mixed with the binder by vigorous mechanical mixing (in a manner similar to that used for blending single-strand PANI-PTSA with epoxy described in Example 13 of Kinlen et al. U.S. Pat. No. 5,543,084). Although a blend made in this manner overcomes the problem of dedoping in U.S. Pat. No. 5,543,084, it is still not ideal. The dispersion contains large and brittle particles. The particles are not small enough for optimal polymer-metal interaction even when the precipitated particles are ground with a ball mill. The large particles do not 'wet' the metal surface. Another problem is that the mechanically stirred suspension is not a stable dispersion. It is difficult to maintain a uniform and stable suspension for large scale industrial production.

The third type of dsPAN disclosed in the '400 patent is a colloidal suspension of small particles. Although the particle size is suitable for the electroactive polymer to interact with the metal surface to impart protection of the metal, the concentration of the colloidal particles in water is quite low (less than 1 gm of colloidal particles per liter of water). This low concentration is incompatible to the preferred high-solid content coating formulation.

PCT Publication WO 97/03127 discloses a chemically modified dsPAN that is soluble in polar organic solvents and can be applied to metal surfaces as a paint. The coating disclosed protected metals from corrosion. These organic soluble dsPANs overcame the water absorption (swells problem of the water-soluble dsPAN disclosed in Liu U.S. Pat. No. 5,489,400. This type of dsPAN is suitable for use as either a solvent-based paint or as a blend with hydrophobic epoxy oligomer for a thermoset coating. This type of dsPAN is not disperable in water to make a stable mixture with water-borne epoxy. Thus this type of dsPAN is not suitable for a water-borne coating application.

Electrophoretic deposition of resins on metals provides excellent corrosion protection for steel used in automobiles and appliances. Using a conducting polymer as additive in the electrophoretic coating bath should enhance the effectiveness for protecting the metals from corrosion. Electrophoretic coatings containing single-strand conducting polymers are disclosed in WO93/14166 and U.S. Pat. Nos. 5,128,396, 5,543,084, 5,556,518. However, the dopants used in these disclosures are non-polymeric small molecular ions which have the disadvantage of dedoping in the e-coat processing and dedoping of the coated metal due to heat or moisture.

SUMMARY OF THE INVENTION

The present invention comprises a composition that advantageously avoids the problem of dedoping common to all the single-strand conducting polymers. A polymeric complex of polyaniline is dispersed in water as latex-like small particles. The polymeric complex is hydrophobic enough so that the problem of water-absorption and swelling of the painted surface is avoided. The particle sizes of the latex-like suspension are small enough so that the $\pi$-conjugated polymers may interact with the metal surface effectively. The percentage of the $\pi$-conjugated polymers in the non-conducive binder can be low enough so that the mechanical strength of the coating is essentially the same as the coating without the $\pi$-conjugated polymer.

The invention comprises a family of two-component polymeric complexes of $\pi$-conjugated polymers that are suitable for water-borne coating applications. The invention also embodies the process of making the polymeric complexes, the use of the polymeric complexes in an anticorrosion formulations, a family of coating compositions containing the polymeric complexes, the method of applying the coating composition on a surface and the coating compositions per se.

More particularly, the present invention comprises:

1. A water-borne coating composition comprising a polymeric complex between a $\pi$-conjugated polymer, a polymeric ion (that serves as a dopant for the $\pi$-conjugated polymer), and a non-conductive polymer (that serves as a binder or resin for coating).
2. A water-borne coating composition as in (1) where the $\pi$-conjugated polymer and the polymeric dopant are strongly (non-covalently) bonded to form a molecular complex.
3. A water-borne coating composition as in (2), where the polymeric molecular complex has substantial any with the non-conductive polymeric binder so that the water-borne dispersion will not segregate, and the dried coating film is homogeneous in composition.
4. A composition described in (3) that can be electrophoretically deposited on a metal substrate to form a coating that contains a polymeric dopant, and a non-conductive polymeric binder. All three components are electrodeposited onto the metal surface with negligible loss of dopants.
5. A coating composition described in (3) or (4) that has enhanced anticorosion performance compared with a coating composition that does not contain a polymeric complex of the $\pi$-conjugated polymer.
6. A coating composition of (3), (4) or (5), in which the non-conductive polymer is a thermoset polymer and the polymeric complex of the $\pi$-conjugated polymer serves the dual function of an anticorrosion additive and a crosslinking agent.
7. Optionally, the said electroactive (or conducting) polymeric complex is used as an additive to a commercial electrocoat formulation that contains additional crosslinking agents.
8. An electrocoating process that allows deposition of the coating composition onto a metal surface.
9. An electrocoating process that allows cathodic deposition of the coating composition onto a metal surface.
10. An electrocoating process of (9) that forms a protective coating on the surface of aluminum alloys.
11. An electrocoating process of (9) that forms a protective coating on the surface of steel.

DESCRIPTION OF THE PREFERRED EMBODIMENTS

In one aspect of the invention, a two component dsPAN complex that is water-borne and satisfies the requirement of hydrophobic/hydrophilic balance is disclosed. The two-component polymeric complex should contain two strands of polymers. One strand is a π-conjugated polymer that imparts electroactive and conductive properties to the coating so that it is effective for protecting metals from corrosion by its interaction with the metal surface.

Another strand is a polymeric ion that is non-covalently bonded to the π-conjugated polymer at a multiplicity of sites due either to electrostatic attraction, hydrogen bonding or van der Waals force. The strong bonding between the two component of the polymeric complex provides the needed stability against the loss of ionic dopants. The improved dopant stability in the double-strand polymeric complex overcomes the deficiencies of the single-strand conducting polymers in the prior art. An example of a double-stranded polymeric complex is the dsPAN which has polyaniline as the π-conjugated component in the complex, and a polymeric anion as the second strand. Examples of other π-conjugated complexes include polyaniline, polypyrrole, polythiophene, poly(phenylene sulfide), poly(p-phenylene), poly(phenylene vinylene), poly (furylene vinylene), poly (carbazole), poly(thienylene vinylene), polyacetylene, and poly(isothianaphthene) having charges thereon when the polymer is in its electrically conductive form.

Examples of the polymeric amions are poly(acrylic acid), poly(methacrylic acid), poly(vinylmethylether-co-maleic acid), poly(methylmethacrylate-co-acrylic acid), poly (ethylmethacrylate-co-acrylic acid), poly(acrylamide-co-acrylic acid), and other anionic polymers.

In addition to the anionic polymers, polymers containing both the anionic and the cationic functional groups such as a protonable amine and a tertiary amine can be used. The ionic functional groups in the second strand serve at least two functions: (1) the anionic groups are the counter ions to the positive charge carriers on the π-conjugated polymer, and (2) both the anions and the cations on the polymer help disperse dsPAN in water so that it can be used as a war-borne coating material.

Another aspect of this invention is that the double-strand polymeric complex is balanced with respect to its hydrophilic and hydrophobic properties. The complex needs to be sufficiently hydrophilic so that complex can be dispersed in water but not too hydrophilic to absorb water after the coating is applied to metals. An example of a dsPAN that is too hydrophilic to be useful for coating is that of a molecular complex between polyaniline and poly(styrenesulfonic acid) Liu et al. U.S. Pat. No. 5,489,400. This polymeric complex PAN:PSSA is water-soluble and is dissolved in that as a highly solvated random-coil of polymer. This dsPAN satisfies one of the requirements that it be dispersable in water but it does not satisfy another requirement for coating. When PAN:PSSA is coated on a surface without a polymeric binder, it is readily re-dissolved when it is immersed in water. When PAN:PSSA is coated on a surface with a polymeric binder such as epoxy or polyurethane, the coating has the problem of being hygroscopic. It absorbs water and swells which is not a desirable property for coatings applications.

It is known that a proper hydrophobic/hydrophilic balance can be achieved to obtain a latex-like dispersion of the complexes by one or both of the following methods: (1) use a polymer (the second strand of the two-component polymeric complex) that contains a certain number of ionic functional groups (hydrophilic) and a certain number of non-ionic organic hydrophobic functional groups attached to the polymer backbone so that the desired hydrophobic/hydrophilic balance is achieved; or (2) use a synthetic procedure that effects a certain polymeric chain folding (similar to the tertiary structures commonly found in globular proteins) that exposes most of the hydrophilic functional groups at the surface of the polymer particles to provide suspension of the particles in water, but maximizes the hydrophobic content of the interior of the polymer particle.

As an example of the first method, the polymeric complex of polyaniline and poly(methylacrylate-co-acrylic acid) is synthesized with an appropriate choice of a relative number of methylacrylate segments and the acrylic acid segments in the polymer chain. A higher percentage of methylacrylate segments make the polymeric complex more hydrophobic, and a higher percentage of acrylic monomer unit makes the polymeric complex more hydrophilic.

The second method involves the molecular self-assembly of a precursor of the polymeric complex. The self-assembled precursor particles are dispersed in water and have a structure that, after a template guided polymerization, results in a polymeric complex that is water-borne but hydrophobic enough for coatings application. The method employs a two-step synthetic procedure. In the first step, precursor particles are prepared that have a hydrophobic core and a hydrophilic surface. In the second step, the precursor particles are polymerized to form a water-borne polymeric complex of the π-conjugated polymer. This synthetic strategy is illustrated in the synthesis of the water-borne, latex-like dsPAN. The synthesis of a water-borne polymeric complex between polyaniline and a polymeric ion poly (vinylmethylether-co-acrylic acid) PVME-MA.

In the first step, the aniline monomers are added to the polymeric ion PVME-MA dissolved in water. The aniline monomers are adsorbed onto the backbone of PVME-MA to form an adduct which has hyrophobic segments at the sites where the aniline monomers are adsorbed. When a substantial length of the polymeric adduct (PVME-MA):(Aniline)$_n$ becomes hydrophobic the polymer chain of the adduct folds into a globular particle with the hydrophobic chains packed in the interior of the globular particle and the hydrophilic groups populate the water/particle interface. It is possible that aggregates of the adducts are present in the aqueous solution at this stage. A solution shows characteristic light scattering phenomenon indicating the formation of particles with 20 to 100 nm radius of gyration. The size of the adduct (PVME-MA):(Aniline)$_n$ particles are adjustable by using a mixed solvent of water and alcohol, the acidity of the solution, and by controlling the temperature of the solution.

In the second step, the precursor is polymerized by introducing an oxidizing agent such as hydrogen peroxide or sodium persulfate. During this stage, the aniline monomers adsorbed in the adduct (PVME-MA):(Aniline)$_n$ are polymerized into a polyaniline which is strongly, but non-covalently, bonded to the polymer PVME-MA to form a polymeric complex (PVME-MA):polyaniline. The polymeric complex is dipersed in the aqueous solution without precipitating out of the solution (as the single-strand polyaniline would precipitate) due to the hydrophilicity at the surface of the particle. The polymeric complex polyaniline:(PVME-MA) is a latex-like suspension in water. It forms a polymer coating on the surface of metal, plastic, glass etceters. Once the water in the coating is evaporated, the coating is no longer redissolvable by water or common solvents. This coating has a high enough content of the hydrophobic groups so that the coating does not have a problem with swelling in water (which is in combat with the water-soluble PAN:PSSA complex) and thus it is suitable for coating applications.

The polyaniline:(PVME-MA) complex synthesized in this manner has the advantages over the single-strand polyaniline because it is water-dispersable and is resistant to dedoping by water or solvent. The polymeric complex with proper hydrophobic/hydrophilic balance is also better suited for coating applications comparing to the water-soluble polymeric complexes disclosed in U.S. Pat. No. 5,489,400 became it reduces the water-swelling problem in the dried coating. The composition of this invention is different from that of a copending international application Yang et al, WO 97/03127 (Electroactive polymer coatings for corrosion control). WO 97/03127 discloses an organic solvent soluble dsPAN while the present invention discloses a water-borne coating composition.

A uniform and stable water-borne resin composition.

Improved uniformity of coating due to molecular association between dsPAN and a non-conductive water-borne resin.

Another aspect of the present invention is a water-borne coating composition that contains a conductive polymeric complex and a non-conductive resin. The resin can be a thermoplastic or a thermoset polymer. The non-conductive polymeric resin serves as a binder for the conductive polymer and it is preferable that the polymeric resin is chosen from a commercial available thermoplastic or thermoset coating material. The polymeric complex of the π-conjugated polymer has the functional groups that leads to a substantial extent of molecular association between the π-conjugated polymeric complex and the non-conductive resin. This intermolecular association is advantageous in two respects: (1) the coating is uniform at a microscopic or nanometer scale with the advantage of stable unsegregated paint or coating bath and a reliable performance for the coated products, and (2) when used as an electrophoretic coating material, the molecular association insures that the resin and the π-conjugated polymeric complex are not separated during the electrocoat process.

The intermolecular association between the π-conjugated polymeric complex and the non-conductive resin comes foam the electrostatic attraction, hydrogen bonding, the hydrophobic interactions, and chemical bond formation. Some of these intermolecular interactions can be demonstrated in an aqueous paint formulation containing a cationic epoxy as the non-conductive resin and the polyaniline: (PVME-MA), or the polyaniline:PAA complex as the eletroactive, π-conjugated polymer. A brief review of the structural features of the cationic resin and the O-conjugated polymeric complex is useful for understanding the intermolecular interactions.

A commercial cationic epoxy resin is a multi-functional epoxide oligomer having chemically-bound tertiary or quaternary ammonium functional groups in addition to the epoxy and hydroxy groups present in other types of epoxy resins. Low-molecular weight epoxy resins with molecular weights between 1,000 and 1,500 are reacted with a secondary amine, forming hydroxyl groups alongside terminal tertiary amino groups. The amine functional groups are subsequently neutralized with a weak organic carboxylic acid such as lactic acid or acetic acid to produce a polymer which is in the form of a water soluble salt. The water-borne resin is then a polycation in an acidic solution.

The π-conjugated polymeric complexes such as the polyaniline:PVME-MA or the polyaniline:PAA complexes two strands of polymers. One of the strands is a polycarboxilic acid. For example, a PVME-MA with a degree of polymerization of about 1000 has about 500 carboxylic functional groups attached to the polymer backbone. A substantial fraction of the carboxylic acid functional groups are ionized if due pH of othe solution is higher than 3 or 4. At this pH the number of positive charges on the polyaniline chain is less than that of the PVME-MA chain. The net charge of the dsPAN is negative. Thus the π-conjugated polymeric complex is a polyanion.

When PVME-MA and the cationic epoxy are mixed in a solution, the electrostatic attraction between the polyanions and the polycations leads to the formation of polymeric complexes. When the electrical charges on the polyanions and the polycations are matched exactly, the polymeric complexes are precipitated from the solution. This phenomenon can be observed in a titration of the PVME-MA solution with a cationic epoxy resin. The precipitation of the charge balanced polyanion/polycation complex is an indication of strong association between the polycation and the polyanion. For a practical formulation for use as water-borne coating, the cationic epoxy resin and the π-conjugated polymeric complex are mixed in a manner that avoids going to the charge-balance point and thus prevents the precipitation. For applications as a cathodically deposited coating, the overall charge of the molecularly associated particles will be positive so that the particle will be electrophoretically driven to the cathode.

In addition to the electrostatic association, there exists multiple hydrogen bonding between the carboxylic acid groups of the polyaniline:PVME-MA or polyaniline:PAA and the nitrogen atoms in the cationic epoxy resin. A type of cationic epoxy resin contains segments of bisphenol-A which provides some hydrophobic interaction with the π-conjugated polymeric complex so that the hydrophobic interactions nay also contribute to the intermolecular association.

The following example demonstrates the existence of the intermolecular association. An aqueous solution of polyaniline:PVME-MA (or polyniline:PAA) mixed with a cationic epoxy was used as an electrophoretic coating solution 20 parts (by weight) of cationic epoxy was mixed with 1 part of polyaniline:PVME-MA. The resulting intermolecularly associated complex of dsPAN and the cationic epoxy in a pH 4.5–5.5 solution is not electrically neutral as evident from the fact the solution is stable without precipitation. Two identical aluminum A6061 coupons (1"×2") were immersed in the resin/dsPAN suspension, and are connected to a DC power supply. An electrophoretic process was carried out with applied voltages ranging from 50 V to 200 V for 90 seconds of coating. When the two electrodes were removed from the coating bath, it was found that the anode had no polymer deposition while the cathode had a uniform layer of polymeric coating. Both coupons were put in an oven (180 C.) for 20 minute. The polymer deposited on the cathode was cured to form a green-colored epoxy coating. The cationic epoxy used was a bisphenol-A diglycidyl ether oligomer which is transparent and had no color. The green-color evidenced the presence of dsPAN in the coating. The UV-visible absorption spectra of the epoxy coating were measured with a reflectance spectrometer. The spectrum obtained matches with that of polyaniline in the electrically conductive state of emeraldine salt. In a control experiment, a solution of dsPAN (pH 4.5) without cationic epoxy was used as an electophoretic bath. The electrophoretic coating resulted in a thin layer of green color on the anode and no deposition on the cathode.

The experiments described in the preceding paragraph provide further support for the existence of the intermolecular association between the dsPAN and the cationic resin. The dsPAN has net negative charge so when it is the only polymeric component in the solution, it electrophoretically migrates to the anode. When dsPAN and the cationic epoxy are mixed in a solution, the intermolecular association between dsPAN and the cationic epoxy takes place. With a proper ratio of mixing, the net charges of the dsPAN:epoxy complex can be made to be positive so that the complex is deposited as one unit onto the cathode.

The controllable association between dsPAN and the cationic epoxy is advantageous. It makes the coating bath more homogeneous and the suspension is more stable than the mixtures of the single-strand polyaniline particles with the same epoxy. The molecularly associated deposition on the electrode is less likely to be phase-segregated during the heat curing process. The result is a more homogeneous and better coating.

With an appropriate catalyst, it is also possible to chemically link the epoxy functional group and the carboxylic functional groups of the two components.

The polymeric complex may be used as a crossed agent for thermoset resins.

Another aspect of the present invention is that the polymeric complex of the π-conjugated polymer may be used as a cross-linking agent for thermoset polymers. For example, the PAN:PAA and PAN:PVME-MA complexes may serve as a cross-linking agent when epoxy is used as a thermal set resin. The epoxide and the hydroxyl functional groups in the epoxy resin are reactive with the carboxylic functional groups in the polymeric complexes PAN:PAA or PAN:PVME-MA. This reaction may be promoted by the presence of an acid or base catalyst or by heat.

The ability for reaction with the binder resins to function as a cross-linker is unique to the double-strand conducing polymers. The single-strand polyaniline or other conducting polymers are not able to contribute to the cross-linking of the binder resin even if the dopants are chosen to contain one or two carboxylic functional groups. If the small molecular dopants are reacted with the resin, the dopant will most likely to be detached from polyaniline or other π-conjugated polymer. It will change the conducting polymer from the doped conductive state to an undoped insulating state and thus lose its electroactivity.

The cross-linking reaction is mostly completed when the π-conjugated polymer containing an epoxy resin is cured at an elevated temperature (60 C. to 180 C.). An obvious advantage is that it is not absolutely necessary to have another cross-linker present in the formulation. A less obvious, but equally valuable advantage is that the cured coating contains a more homogeneous concentration of the π-conjugated polymers and the π-conjugated polymers will not be mobile during the service life of the coating. This may be advantageous over the single-strand polyaniline which is only blended with the resin polymer without covalent bonding to anchor the π-conjugated polymer. Under heat or aging, the π-conjugated polymers may migrate and segregate into domains within the coating. Such possibilities will make the performance of the coating decline with time. The π-conjugated polymer is strongly bonded with the polymeric second strand which, in turn, is covalently anchored to the 3-dimensional network of the thermal set resin after curing. With a molecularly dispersed mixture of the dsPAN in epoxy, and the covalent anchoring of the polymeric complex in the resin, the properties and the performances of the coating is expected to be more stable than the polymeric blends of the single-strand polyaniline.

It is found that when the electroactive polymer is used with more than 3% weight of the epoxy resin, the curing is complete and the cured resin mixture is a tack-free and hard coating. When the coating formulation is slightly more acidic than the normal e-coat bath, a complete curing of the epoxy is possible with as low as 1% of the π-conjugated polymers. It is believed that the acidic form (which has mobile radical cations on the π-conjugated backbone) is capable of catalyzing the cross-linking reaction between the dsPAN and the epoxide. The catalyst may also promote the polymerization of the epoxides.

Effective for anticorrosion without the need for high dsPAN content.

A surprising discovery of this invention is that a very low percentage of dsPAN in a binder resin is effective for an improved protection against corrosion. Samples of epoxy coatings on aluminum and steel with dsPAN content ranging from 6% to 1% of PAN:PVME-MA or PAN:PAA were tested against the conventional electrophoretic coatings. Both the ASTM B-117 salt-fog spray tests and electrochemical impedance spectroscopy tests showed that the dsPAN containing epoxy coatings are more effective than the traditional electrocoats.

The dsPAN performs better in an environment with wider pH range. The dsPAN coating is more resistant to deprotonation than the single-strand PAN.

The dsPAN is advantageous over the single-strand PAN in another aspect. The single-strand PAN loses its electrical conductivity when it is in contact with water of pH 5 or higher. In fact a pH titration of the single strand polyaniline showed that the electrical conductivity begins to decrease at pH 3 to 4. The single-strand polyaniline changes its color from green to blue when the pH value is raised above pH 5. The double-strand polyaniline is much more resistant to deprotonation. For example a water suspension of PAN:PAA and PAN:PVME-MA remains in the green, conductive state until pH 8.5 to 9. The polyanionic second strand in the double-strand polymer is responsible for providing a microscopic environment that shifts the pH value for the conductor-to-insulator transition. ("Double-strand polyaniline as a molecular quasi-memory to chemical stimuli," G. P. Kota, L. Sun, H. Liu, S. C. Yang, Mat. Res. Sac. Symp. Proc., Vol. 488, pp359–364 (1998).)

When the coatings containing polyaniline and resin binders are tested in neutral pH aqueous salt-fog spray (ASTM B-117) or immersion over a period of time, the loss of corrosion resistance and the loss of electrochemical impedance were found to be coincident with the time when the color of the polyaniline component is changed from green to blue, signifying that the conductive green colored state (emeraldine salt) of polyaniline is more effective anticorrosion ingredient than the insulating blue colored state (emeraldine base). Furthermore, when a conducting polymer is deprotonated with amonia before coating on metal, the coating does not have a measurable advantage in anticorrosion than the coating without the π-conjugated polymer. This again indicates that the conductive state is much more effective than the noncoductive state of polyaniline for anticorrosion. It was found that the coating (with a mixture of π-conjugated polymer and the nonconductive resin) does not need to be an electrical conductor. It is only required that the π-conjugated polymer is in its electrically conductive state. Even when the conductive polymers do not form a continuous network in the coating to render macroscopic conductivity, the π-conjugated polymers in the coating resin are still effective for anticorrosion. When the π-conjugated polymers are deprotonated to change to its emeraldine base form the effectiveness for anticorrosion is lost.

The dsPAN, being more resistant to deprotonation, is applicable for a wider range of environments. The traditional single-strand polyaniline is effective only in a slightly acidic environment (pH<5). The dsPAN containing resin is effective for pH neutral environment (pH 5–7) and the sea water (pH 8).

dsPAN is compatible with commercial water-borne coating formulations.

The double-strand conductive polymers can be used as an additive to the commercially available water-borne paints or electrocoat baths. The water-borne paint formulation with the added conducting polymer is a stable suspension if a proper procedure (described in the examples) for mixing the additives is followed. The new formulation can be electrocoated by a normal electrocoat procedure. Samples of electrocoated metals cured at 180° C. resulted in hard coatings. The coated samples were tested and were found to have improved anticorrosion properties compared to the control samples.

Curing with conventional curing agents:

The conventional chemically modified or capped polyamines, polymercaptans or polyisocyanates be used as curing agents. These curing agents need to be chemically modified or capped to prevent reaction with epoxy in the electrophoretic coating bath. The cross-linking is completed at elevated temperature during baking.

Alternatively, a high-temperature curing agent can be used. Examples of high-temperature curing agents are polycarboxylic acids, polyanhydrides, polyphenols and carboxyfunctional polyesters. These curing agents, in absence of a catalyst, do not react with the epoxy at room temperature but reacts at an elevated temperature during baking.

The coating may be applied onto metal surfaces with or without the conventional surface treatment.

The traditional processes for coating aluminum alloys include surface treatments that use chromate surface conversion. The coatings of the preset invention can be applied onto the surface of a bare aluminum alloy without surface pretreatment. The present coating on aluminum samples without surface pretreatment showed good resistance to corrosion. The present coating formulation is useful as a coating that replaces the toxic chromates in coatings applications.

The coating may be applied either by painting or electrodeoposition.

The water-borne coating composition containing the double-strand conducting polymer may be applied to a metal surface by painting, immersion, or electrodeposition.

EXAMPLE 1

Synthesis of Polyaniline: Poly(acrylic acid) Complex with $r=N_{AN}/N_{-COOH}=1$, [Polyaniline:poly(acrylic acid), r=1

(Here, we use the symbol ":" to indicate the non-covalent bonding between two polymers. The value of r specifies the ratio $N_{AN}/N_{-COOH}$)

Step 1: Adsorption of Aniline onto Poly(acrylic acid) to Prepare [Poly(acrylic Acid):(Aniline)$_n$]:

A complex [poly(acrylic acid):(Aniline)$_n$] is prepared by adsorbing (or binding) the aniline monomer onto the poly(acrylic acid) in a water/methanol solution. The adsorbed aniline molecules are later polymerized into polyaniline in Step 3.

Mix 10 ml of methanol with 7.208 gm of poly(acrylic acid) aqueous solution (containing 25% of PAA, Polysciences, MW=90,000). Water is added to increase the volume of the solution to 100 ml. This solution is rigorously stirred with a magnetic stirrer for 15 minutes. This solution contains 0.025 moles of poly(acrylic acid).

Slowly add 2.328 g of freshly distilled aniline to the poly(acrylic acid) solution under rigorous stirring. An additional 10 ml of methanol is added. Stirring is continued for 30 minutes. The total amount of aniline equals 0.025 mole. The mixture has a pH value of about 5.

The following observations are consistent with the formation of a molecular complex between the aniline molecules and the poly(acrylic acid). The viscosity of the solution is significantly increased upon the addition of aniline. The measured increase in intrinsic viscosity is much more than that expected from a simple mixtre of aniline and poly(acrylic acid). For a simple mixture with no binding between aniline and the complexes, the intrinsic viscosity should be about equal to the sum of the two components in pH 5 solution. The high viscosity is consistent with the binding of aniline onto the poly(acrylic acid) chain. When aniline is adsorbed onto poly(acrylic acid), the polymer chain is more extended than that of the original poly(acrylic acid) random coil, and thus the viscosity is much higher. The aniline molecules may bind to poly(acrylic acid) by hydrogen bonding, or the anilinium ions may be strongly attracted by the electrostatic force from the ionized portion of the poly(acrylic acid). The latter electrostatic is known as "counter ion condensation" for polyelectrolyte (Reference: G. Manning, J. Chemical Physics, 89, 3772 (1988), Accounts of Chemical Research, 12, 443 (1979)). The non-covalent binding between aniline monomers and the poly(acrylic acid) is represented by a colon ":" in the symbol for the adddet poly(acrylic acid):(An)$_n$.

Step 2: Formation of an Emulsified Poly(acrylic acid):(An)$_n$ Adduct 100 ml of 2 M HCl is added to the poly(acrylic acid) :aniline solution. The solution turns milky white immediately due to the scattering of the ambient light by a macroemulsion of the polymeric complex. When the solution is continuously stirred vigorously, the intensity of light scattering decreases and the color of the scattered light gradually changes from milky white to nearly transparent with a tint of turbidity. When this faintly turbid solution is examined by illumination with a focused beam of white light (or sun light) and viewed at an angle against a dark background, the scattered light has a blue tint.

The solution initially turns to milky white macro emulsion because the acid added to the solution decreases the degree of ionization of the poly(acrylic acid):(An)$_n$ adduct formed in Step 1. The unionized adduct becomes more hydrophobic and folds into particles that contain an interior hydrophobic core that is rich in aniline adsorbed to the poly(acrylic acid). The exterior surface of the particles may be more hydrophilic with some ionized carboxylate groups in contact with the surrounding water molecules. The emulsified particle in this case is likely to be an aggregate of the polymeric adduct poly(acrylic acid):(An)$_n$ which is hydrophobic if the aniline molecules remain bounded to the poly(acrylic acid) when the hydrochloric acid is added. Immediately after the addition of the hydrochloric acid, the size of the aggregated particle is large, but the aggregates rearrange into smaller particles in the methanol solution.

The change in the light scattering is consistent with an initial formation of macro-emulsion that scatters visible light of all colors, and, the subsequent transformation into micro emulsion with smaller particle size that scatters only the shorter wavelength region of the visible light. The presence of methanol or other polar organic solvents helps to break the initial macro emulsion into smaller particles. The small particle is, to some extent, similar to the micro emulsions found in emulsion polymerization for the production of latex (Reference 1: Blackley, D.C, "Emulsion Polymerization," Wiley, N.Y. 1975. Reference 2: K. O. Calvert, "Polymer Latices and ther Applications," MacMillan, N.Y. (1982).). Unlike the ordinary oil-in-water emulsions, the hydrophobic core in the particles prepared here is not only a microscopic droplet of aniline, but it is a complex of aniline adsorbed on the poly(acrylic acid) backbone. The poly(acrylic acid):(An)$_n$ adducts may aggregate or fold to form a hydrophobic core, and the ionized carboxylic acid groups are presumably located at the interface with water. In this emulsified poly (acrylic acid):(An)$_n$ adduct the poly(acrylic acid) molecule serves two roles: (1) It serves as a template polymer that binds the monomer of the second polymer to form a precursor for the polymeric complex [Polyaniline:poly(acrylic acid), r=1]. (2) It serves as an emulsifier that helps to adsorb the aniline monomers in the interior of the emulsified particle.

Step 3: Polymeriztion of the Emulsified poly(acrylic acid):(An)$_n$ Adduct 3 drops of 1 M aqueous ferric chloride (FeCl$_3$ in 2 M hydrochloric acid) were added to the solution prepared in step 2. 3 ml of 30% hydrogen peroxide (0.026 mole of H$_2$O$_2$ was slowly added to the reaction mixture with constant stirring. The solution immediately turned to a dark green color indicating that the aniline monomers are polymerized into polyaniline. The ferric ion in the solution is a catalyst for the oxidative polymerization. The reaction was essentially completed within 30 minutes. The reaction mixtures were stirred for another 30 minutes before starting the purification steps. The reaction product stayed in the aqueous solution for months with no significant precipitation of the reaction product.

The low molecular weight ionic and water-soluble species of the reaction product was removed by dialysis. The solution was dialyzed with a dialysis tube (SPECTRA/POR, molecular weight cutoff at 3,500) against a large volume of distilled water. The dialysis was repeated with fresh distilled water until no ferric ion was found (by thiocyanate tests) in the distilled water outside the dialysis tube.

Repeated experiments showed that the use of methanol/water mixed solvent in Step 1 is important. Without an adequate amount of methanol, during the preparation stage of Step 1, the final product in Step 3 will precipitate either immediately or within a week.

With the addition of methanol, ethanol, or some other organic polar solvent, the product of Step 3 may be indefinitely suspended in the solution. The polar organic solvent mixture is only needed for the preparation of the micro emulsion of the precursor poly(acrylic acid):(An)$_n$ adduct before the polymerization step, it is not needed for stabilizing the polymerized product. The entire amount of methanol in the reason product of Step 3 can be removed without causing the reaction product [Polyaniline:poly(acrylic acid), r=1] to precipitate. The methanol was removed by dialyzing against a large volume of water to significantly reduce the concentration of methanol, or by heating the solution to evaporate methanol. The role of methanol might be to reduce the particle size during Step 2 so that the polymerized final product is suspendable in water. It was found that if Step 3 were effected before the white macro emulsion had enough time to change to the transparent micro emulsion, the reaction product would not be dispersed in water but would precipitate within a day or two. This indicates that the transformation from the macro emulsion to micro emulsion is important to the formation of water-borne polymer complex. In a variation of the above procedure, the methanol was not added in Step 1, but was added at the beginning of Step 2. This modified procedure also produced water-borne polyaniline complexes that were stable in aqueous solution supporting the theory that the function of methanol is to facilitate the reduction of the particle size of emulsified precursors.

Experiments showed that it was best to start the polymerization Step 3 within a short amount of time (within a few hours) after the white macro emulsion was changed to a bluish tinted micro emulsion in Step 2. When the solution of Step 2 is left for days before carrying out Step 3, the reaction product is a precipitate and is mostly chloride doped polyaniline instead of the polyaniline:poly(acrylic acid) complex. This may be due to the extraction of the aniline molecule from the micro emulsion into the aqueous phase to form anilinium ions. The micro emulsion produced in Step 2 is probably at a metastable state instead of being in an equilibrium state of the solution.

EXAMPLE 2

Synthesis of Polyaniline: Poly(acrylic acid) Complex with r=$N_{AN}/N_{-COOH}$=1.5 [Polyaniline:poly(acrylic acid), r=1.5].

In this example, the aniline content is increased to r>1 to obtain a stable suspension (or emulsion) in water.

Step 1: Adsorption of Aniline Onto Poly(acrylic acid) to Prepare [poly(acrylic acid):(Aniline)$_n$]:

7.208 gm of 25% by weight of poly(acrylic acid) (from Polyciences, MW=90,000) was added to 10 ml of methanol, then water was added to make 100 ml of poly(acrylic acid) solution. This solution was transferred to a round bottom flask with a magnetic stirrer and continuous rigorous stirring was initiated for 15 min. (Total # of moles of carboxylic acid functional groups=0.025 mole.)

3.492 gm of freshly distilled aniline was slowly added to the poly(acrylic acid) solution under rigorous stirring. An additional 10 ml of methanol was added. Stirring was continued for an additional 30 minutes. All solid materials were dissolved at this time. (Total amount of aniline equals 0.038 mole). The viscosity of the solution is significantly increased after the addition of aniline.

Step 2: Formation of an Emulsified Poly(acrylic acid):(An)$_n$ Adduct.

100 ml of 2 M HCl was added to the poly(acrylic acid):aniline solution. A turbid solution was formed initially. The solution was milky white immediately after the addition of the hydrochloric acid due to the scattering of the ambient light by the macro-emulsion of the polymeric complex. When the solution was continuously stirred vigorously, the intensity of light scattering decreases and the color of the scattered light changes from white to transparent with slightly tinted turbidity.

Step 3: Polymerization of the emulsified Poly(acrylic acid):(An)$_n$ Adduct 3 drops of 1 M aqueous ferric chloride (FeCl$_3$) in 2 M hydrochloric acid were added to the reaction mixture. 4.4 ml of 30% hydrogen peroxide (0.039 mole of H$_2$O$_2$) was added to the reaction mixture with constant stirring for an additional hour. The liquid is dark green in color. The reaction product stayed in the aqueous solution for months with no significant precipitation of the reaction product The low molecular weight ionic and water-soluble species of the reaction product was removed by dialysis. The solution was dialyzed with a dialysis tube (SPECTRA/POR, molecular weight cutoff at 3,500) against a large volume of distilled water. The dialysis was repeated with fresh distilled water until no ferric ion is found (by thiocyanate tests) in the distilled water outside the dialysis tube.

The green-colored aqueous solution contained a stable suspension of the reaction product. The suspension was stable indefinitely. Negligible amount of the product precipitated from the solution on standing for a long period of time. The solution can be filtered through filter papers without significant loss of solid material. When 1 ml of the solution was diluted with slightly acidic distilled water (0.01 M HCl) the suspension remained stable. This dilute solution showed the scaling of light indicating a colloidal suspension. A contrast could be seen by comparing this solution with a solution of the polyaniline: poly(styrene sulfonic acid) complex (r=0.5) (see Example 11 below) which shows negligible light scattering at the same concentration. It had been previously established that the polyaniline:poly(styrenesulfonic acid) molecular complex was dissolved in water as a true solution.

The suspension remained stable upon heating in a water bath at 70° C. overnight. When the water vapor was allowed to escape from the container of the solution, the total volume of the solution was reduced and a high solid content solution was formed. Water-borne suspensions with 30% solid content were found to be stable against precipitation. The suspension was completely precipitated by addition of equal volume of acetone. This property was similar to the common water-borne latex paints.

The following test shows that the suspension of [polyaniline:poly(acrylic acid)](r=1.5) has a property similar to a latex suspension which is suspendable in water but is insoluble after it is painted on a surface and is allowed to dry after painting on a surface. The green colored liquids with solid content ranging from 10% to 30% were painted on glass slides, a sheet of poly(methylmethacrylate), and a coupon of alumimum alloys. The green-colored paint was allowed to dry in the air at room temperature. The dried films stayed on the surface of the substrate with varying degrees of adhesion. These films were immersed in water for 24 hours, the film remained as solid and had no sign of being dissolved.

A comparative test was performed with a [polyaniline:poly(styrenesulfonic acid), r=0.5] complex which is a water soluble polymeric complex prepared by a method of the prior art. The film coated with [polyaniline:poly(styrenesulfonic acid), r=0.5] complex is completely dissolved in water within 10 minutes. This test shows the utility of the water-borne [polyaniline:poly(acrylic acid), r=1.5]. It can be used as a water-borne coating material, but the dried coating stays permanent and resists washing off by water or other solvents.

The procedure outlined in examples 1 and 2 may be applied to the synthesis of other polymeric complexes of polyaniline to produce latex-like water-borne suspension of the reaction product. The following examples show the synthesis of the molecular complex of (polyaniline:poly(vinylmethylether-co-maleic acid), r=1 to 4] and the analysis of the composition of the reaction products.

EXAMPLE 3

Synthesis of [PAN:PVME-MA, r=1]

1.92 gm of poly(vinylmethylether-co-maleic acid), PVME-MA, (containing 0.022 moles of carboxylic functional groups, Aldrich, M. W.=67,000) was dissolved in 25 ml of distilled water. 5 ml of methanol was added and 2 grams of aniline (0.022 mole of aniline) was slowly added to this solution and stir for one hour. At this stage, aniline is adsorbed on PVME-MA to form the adduct [poly(vinylmehtylether-co-maleic acid):(An)$_n$].

25 ml 3 M HCl and $6.0 \times 10^{-4}$ mole of ferric chloride was slowly added to the solution and stirred for 30 minutes. At this stage, the micro emulsion of the adduct [poly(vinylmethylether-co-maleic acid):(An)$_n$] is stabilized to an appropriate size in the acidic solution.

2.5 ml of 30% hydrogen peroxide (containing 0.022 mole $H_2O_2$) was slowly added to initiate the polymerization of the adduct of aniline and PVME-MA. The reaction mixture soon become green in color. After vigorous stirring for 2 hours, the reaction mixture was poured through a filter paper to remove small amounts of particles. The filtrate was a dark green homogeneous aqueous dispersion of the reaction product.

The suspension stability: The as-obtained solution remained homogeneous for more than one year without precipitation. The dispersed product did not flocculate in salt solutions such as 0.37 M of sodium sulfate indicating good stability against salting out.

The low molecular weight ionic and water-soluble species of the reaction product was removed by dialysis. The solution was dialyzed with a dialysis tube (SPECTRA/POR, molecular weight cutoff at 3,500) against a large volume of distilled water. The dialysis was repeated with fresh distilled water until no ferric ion was found (by thiocyanate tests) in the distilled water outside the dialysis tube.

EXAMPLE 4

A water-borne coating composition containing 1 wt % of PAN:PVME-MA and 20 wt % of cationic epoxy.

Solution A: 50 ml of the reaction product obtained in example 3. The solution contained about 5 gram of the polymeric complex PAN:PVME-MA.

Solution B: 250 ml of cationic epoxy (trade name: Powercron resin, product code CR648) manufactured by PPG Industries. The solution contains 39.5% solid by weight.

The first step was to prepare a slightly acidified dilute solution of the cationic epoxy resin (solution C).

Solution C: 50 μl (micro litter) of 85% lactic acid was added to 200 ml of distilled water. To this aqueous lactic acid solution was added 63 ml of solution B, with string. The change in the light scattering characteristics of the solution suggested that the particle size of the epoxy resin of this diluted solution is smaller than the original solution B which was milky white. Solution C, when viewed under sun light, was translucent with a slight red color of the transmitted light (forward light scattering).

50 ml of solution A was slowly added into solution C, with mechanical stirring of the solution. The solution become green in color due to the presence of the polymeric complex dsPAN. The mechanical sting continued for 10 minutes. The remaining 187 ml of solution B was added into this mixture. The resulting solution was homogeneous, milky, with a strong blue-green color. The resulting solution had a pH value between 4.7 to 5.3. The total volume of the solution was 500 ml with 20% weight of epoxy and 1% by weight of PAN:PVME-MA. The solution was stable. No precipitation was formed after a storage of three months.

Although the same weight composition can be made by directly mixing solutions A and B with 200 ml of water (with or without the 50 μl of lactic acid), the resulting solution is not as stable as the two-step mixing process with the intermediate Solution C. When solutions A and B are directly mixed the suspended particles in the water are precipitated out of the aqueous solution. The precipitated particles are the charge-balanced complexes between the cationic epoxy and the anionic PAN:PVME-MA. The two-step process of using an intermediate Solution C is preferred. In preparing solution C, it is preferred to use a small amount of acid to help dissociate the aggregated epoxy particles into smaller particles. Examples of acids are lactic acid, acetic acid and hydrochloric acid.

EXAMPLE 5

A water-borne coating composition containing 1 wt % of PAN:PAA and 20 wt % of cationic epoxy.

The same procedure as described in example 4 was use except the polymeric complex PAN:PAA came from the products of either example 1 or example 2.

The resulting solution contained 1 wt % of PAN:PAA complex and 20 wt % of a cationic epoxy resin. The solution is homogeneous, stable and no precipitation of particles after three months.

EXAMPLE 6

A water-borne coating composition containing 0.2 wt % of PAN:PVME-MA and 20 wt % of cationic epoxy.

The procedure was the same as that used in example 3 except that solution A was replaced by an aqueous solution with 1 gram of PAN:PVME-MA in 50 ml of water.

EXAMPLE 7

A water-borne coating composition containing 0.2 wt % of PAN:PAA and 20 wt % of cationic epoxy.

The procedure was the sane as in example 6 except that the products from either example 1 or example 2 were used to prepare solution A.

EXAMPLE 8

Electrophoretic coating of the electroactive resins on metals.

The solutions prepared in examples 4–7 were used as coating baths in an electrophoretic coating process to deposit a polymeric costing on metals. Metal plates were first polished with sand papers (100 grids and 300 grit) and rinsed with distilled water followed by a rinse with methylene chloride. These meal plates were connected to a direct current power supply. The metal to be coated was connected as a cathode and a platinum electrode was connected as an anode. The electrodes were immersed in a coating bath produced by the methods described in one of the examples 4–7. A voltage of 50 V to 200 V range was applied to the electrodes for 90 seconds. The metal plate removed from the bath show blue-green colored coating of the resin. After a rinse with distilled water, the coated sample was allowed to dry in the air for 10 minutes before curing in an oven at 180 ° C. for 20 minutes The cured samples were smooth and hard. It should be noted that the conventional curing agents such as the multi functional amines were not used in the coating formulation. In these examples, the curing agent is the polymeric complex dsPAN. The dsPAN is a double-strand polymer which has the polyaniline molecule as one strand (the first strand) and the polymeric dopant as the other strand(the second strand). For PAN:PAA, the second strand is poly(acrylic acid. For PAN:PVME-MA, the second strand is poly (methylvinylether-co-maleic acid). In both polymer, the second strand has carboxylic functional groups on the polymer. This carboxylic function group reacts with the epoxy or the hydroxy functional groups of the epoxy. These reactions cause the cross-linking of the epoxy resin. The epoxy resin is cured by using low weight percent of the carboxylic acid polymers. It is possible the dsPAN also functions as a catalyst for the polymerization of the oligomeric epoxy to high molecular weight epoxy.

EXAMPLE 9

Corrosion Tests

Samples prepared in Example 8 and control samples were placed in a salt-fog spray chamber according to the standard procedure ASTM B-117 ("Testing of Organic Coatings" by N. I. Gaynes, Noyes Data Corporation, Park Ridge, N.J., 1977).

Test Samples:

Test samples were coated coupons of aluminum alloys with dimensions of 1"×2"×1/16". Aluminum alloys AL2024-T3, A7075-T6, A6061-T6 were obtained from Metal Samples Company, Munford, Ala. The metals were manufactured by Kaiser Aluminum Co. The coating bath and the water-borne resins are described in Examples 4–7. The electrophoretic coating process is described in Example 8.

The Control Samples:

For the purpose of evaluating the effect of the electroactive polymer as an anticorrosion additive, control test samples were prepared using the known art of electrophoretic coating.

Typical commercial cataphoretic coating formulation contains chemically modified epoxy resins which are water-soluble or water-dipersable cross-linking agents, pigments and other additives. A coating bath is made by mixing the epoxy resin, with the cross-linking agents, pigments and other additives. The resin was dispersed in water with solid content between 10% and 40%. The control samples were made from a formulation produced by the PPG Industries (Cleveland, Ohio). The formulation has the trade name of Powercron which consists two parts: (1) an epoxy resin with a product code of CR648 Resin which is a cationic epoxy, and (2) a curing agent containing polyamines and lead silicate with the product code of E6066 Paste.

Preparation of the Coating Bath for the Control Samples:

One liter of coating bath was prepared by first mixing 410.5 ml of CR648 Resin (39.5% solid content) with 553 ml of de-ionized water which resulted in a milky solution. To this solution is added 58.5 grams of paste (a grey colored pat). The mixture was constantly stirred to avoid separation. The resulting solution had about 19–21% solid content.

Electrophoretic Coating

The electro coating was done in the same way as that for the dsPAN containing samples described in Example 8.

Metal plates were first polished with sand papers (100 grit and 300 grit) and rinsed with distilled water followed by a rinse with methylene chloride. These metal plates were connected to a direct current power supply. The metal to be coated was connected as a cathode and a platinum electrode was connected as an anode. The electrodes were immersed in the coating bath. A voltage of 50 V to 200 V range was applied to the electrodes for 90 seconds. The metal plate removed from the bath show blue-green colored coating of the resin. After a rinse with distilled water, the coated sample was allowed to dry in the air for 10 minutes before curing in an oven at 180 ° C. for 20 minutes

Salt-fog Spray ASTM B-117 Test Results

The test samples and the cools were tested in the salt-fog spray chamber for 1000 hours. The coatings were injured by cutting a cross with a sharp knife blade to expose the aluminum metal before placing in the test chamber. The general conclusion of the test results is that the dsPAN containing coating formulation performs significantly better than the prior art cataphoretic epoxy coating for aluminum alloys without chromate or phosphate surface pretreatment. The coatings of this invention were found to be effective to reduce filiform corrosion, undercutting and crevice corrosion. The dsPAN cured epoxy is adhesive to the metal. The polymeric complex dsPAN is sufficiently hydrophobic so that there is no swelling of coating by water. The coating of the present invention is effective for a wide range of dsPAN content in the epoxy. The content of dsPAN can be as low as 1% of the epoxy resin in the coating and still be effective for improving the anticorrosion performance over that of the control samples. In general, the preferred composition is a coating with dsPAN ranging from 1% to 10% of the epoxy. The tests also demonstrated that the dsPAN containing coating performs better than the single-strand polyaniline of the prior art. The problem of deprotonation for the single-strand polyaniline in the pH neural aqueous environment makes the single-strand polyaniline less effective for protection of metals exposed to water, rain and moisture. In a salt-fog spray test, the single-strand polyaniline changes from the emeraldine salt (a green-colored conductor) to the emeraldine base (a blue colored insulator) due to deprotonation by water. This on is generally associated with a decrease of electrochemical impedance in an Electrochemical Impedance Spectroscopy (EIS) test. During our previous salt-fog spray test we found that the change from the green colored conductor to the blue colored insulator is a signal for the loss of protection against corrosion. All the dsPAN coatings remain in the green conductive state after they were exposed to salt-fog spray for 1000 hours in the ASTM B-117 tests. This result confirms that the resistance to deprotonation as another advantage of dsPAN coating over the single strand polyaniline of the prior art.

Figure 1:
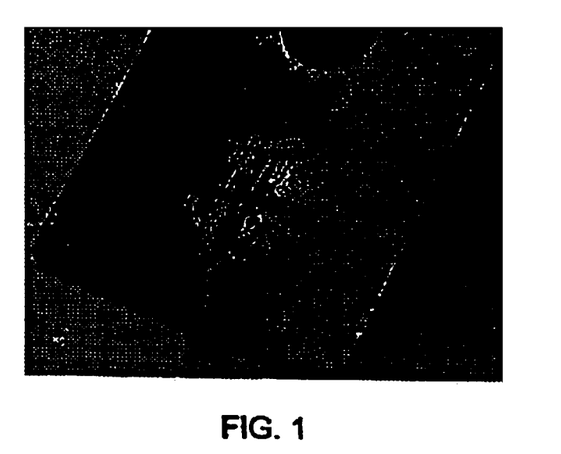
FIG. 1 is a photograph of a cool control sample.
Figure 2:
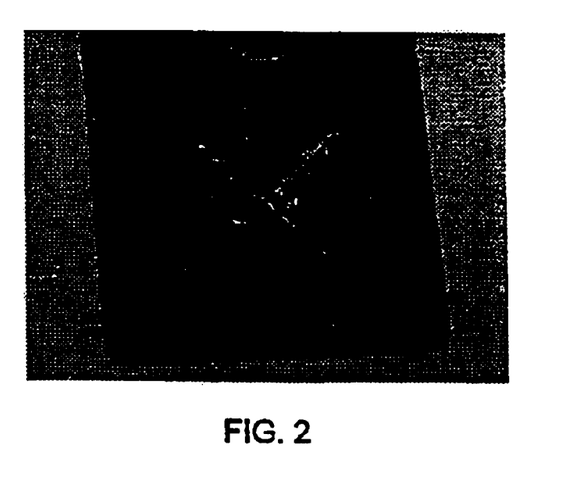
FIG. 2 is a photograph of a sample coated with a composition of the invention.

FIGS. 1 and 2 show comparative results. A control sample of dsPAN (FIG. 1) was compared with a dsPAN containing coating under nearly identical conditions. The coated samples were cut with a cross to create a defect on the organic coating and to expose the metal surface before the test begun. Both samples were placed in a salt-fog spray chamber (ASTM B-117). The dsPAN sample was exposed to salt-fog spray for 42 days while the control sample was exposed to salt-fog spray for 35 days. These samples were then removed from the spray chamber and were stored in air for 60 days. Photographs were taken at the end of the test. The dsPAN sample was electrocoated by a procedure described in Example 8 using the coating bath described by Examples 1 and 5.

FIG. 1 shows that filiform corrosion spreads from the scratched coating well before the required 1000 hours of salt-fog spray. This indicates that the electrophoretic coating of the control sample does not protect the aluminum alloys from corrosion. FIG. 2 shows an example of the similarly scratched sample that shows no sign of undercut and any sign of filiform corrosion. In this example the base metal was AL2024 alloy. Similar results were demonstrated in the aluminum alloys AL7075-T6. The dsPAN containing coating performs much better than the control samples. For AL6061 alloy, both the control and the test samples survive the 1000 hour salt-fog spray ASTM B-117 test the difference is not as significant as that of the AL2024 and AL 7075 alloys.

EXAMPLE 10

In this example, the water-borne dsPAN was used as an additive to a commercial coating formulation. In this formulation both the resin and the curing agent were combined with the water-borne dsPAN. The dsPAN used in this formulation can be considered as an additive to the commercial coating formulation.

The coating bath was prepared by adding a curing agent to the baths prepared in Examples 4–7. Typical curing agents known for cross-linking epoxy can be used. The conventional chemically modified or capped polyamines, polymer-captans or polyisocyanates can be used as curing agents. These curing agents need to be chemically modified or capped to prevent reaction with epoxy in the electrophoretic coating bath. The cross-linking is completed at elevated temperature during baking. Alternatively, a high-temperature curing agent can be used. Examples of high-temperature curing agents are polycarboxylic acids, polyanhydrides, polyphenols and carboxyl-functional polyesters. These curing agents, in absence of a catalyst, do not react with the epoxy at room temperature but react at an elevated during baking.

A commercially available curing agent manufactured by PPG Industries (Cleveland, Ohio) is used in this example for demonstration purposes but a broad range of water-borne curing agents can be used. The trade name of the curing agent is Powercron Paste with product code E6066.

The coating formulation is prepared by adding the Powercron Paste (E6066) to the solutions described in Examples 4–7 with the ratio of 58.5 grams of the Powercron Paste to 410 ml of the Powercron Resin (CR648, 39.5% solid content in water). The resulting solution is gray with a tint of blues color. These solutions were used as a coating bath to coat aluminum and steel samples by the electrocoat process described in Example 8.

Corrosion tests of the samples were conducted in the same manner as described in Example 9. The results are similar to that obtained for the coating formulation used in Examples 8 and 9. Both the test samples and the control samples contain the same Powercron epoxy resin and the same Powercron Paste. The only difference is that the test samples contain one additional component which is the polymeric complex of the double-strand polyaniline (dsPAN). Samples tested contain dsPAN at a 1% to 10% level of the total weight of the dried coating. The test results show that the formulation of the present invention is effective as an additive to the conventional electrophoretic coating for protecting metals from corrosion.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described our invention, what we now claim is:

1. An anti-corrosive coating which comprises:
    a water-borne polymeric complex comprising a strand of
        a -conjugated polymer selected from the group consisting of polyaniline, polypyrrole, polythiophene, poly (phenylene sulfide), poly(p-phenylene), poly (phenylene vinylene), poly(furylene vinylene), poly (carbazole), poly(thienylene vinylene), polyacetylene, and poly(isothianaphthene);
    a polymer strand selected from the group consisting of poly(acrylic acid), poly(methacrylic acid), poly (vinylmethylether-co-maleic acid), poly(methylmethacrylate-co-acrylic acid), poly(ethylmethacrylate-co-acrylic acid) and poly(acrylamide-co-acrylic acid), the polymer strand being non-covalently bonded to the -conjugated polymer strand; and a a non-conductive polymer, the non-conductive polymer being complexed with the water-borne polymeric complex, the water-borne polymeric complex having hydrophilic/hydrophobic regions configured to allow the coating to be water soluble prior to application of the coating onto a surface and water insoluble after the coating has been applied to the surface.

2. The coating of claim 1 wherein the non-conductive polymer is selected from the group consisting of thermoset or thermoplastic resins.

3. The coating of claim 2 wherein the resins are selected from the group consisting of epoxy, acrylic, alkyd, vinyl, urethane and olefinic resins.

4. The composition of claim 1 wherein the non-conductive polymer is an epoxy and the coating further comprises:

a curing agent selected from the group consisting of capped polyamines, polymercaptans and polyisocyanates.

5. The coating of claim 1 wherein the non-conductive polymer is an epoxy resin and which further comprises:

polycarboxylic acids, polyanhydrides, polyphenols and carboxy-functional polyesters.

6. The coating of claim 4 wherein the epoxy is a cationic epoxy resin.

7. The coating of claim 4 wherein the polymeric complex is cross-linked to the epoxy resin.

8. A method of forming an anti-corrosive coating which comprises:

dissolving a strand of polymeric ion selected from the group consisting of poly(acrylic acid), poly(methacrylic acid), poly(vinylmethylether-co-maleic acid), poly(methylmethacrylate-co-acrylic acid), poly(ethylmethacrylate-co-acrylic acid) and poly(acrylamide-co-acrylic acid in a medium comprised of water;

adding a plurality of monomers selected from the group consisting of aniline, pyrrole, thiophene, phenylene sulfide, p-phenylene, phenylene vinylene, furylene vinylene, carbazole, thienylene vinylene, acetylene, and isothianaphthene to the medium;

adsorbing the monomers onto the strand of the polymeric ion to form a polymeric adduct;

folding the polymeric adduct to form a particle, the particle having an interior and an exterior, at least a portion of the interior of the particle being hydrophobic and at least a portion of the exterior of the particle being hydrophilic, the exterior of the particle interfacing with the medium;

subjecting the particle to an oxidizing environment to form a polymeric complex, the polymeric complex comprising a strand of a -conjugated polymer selected from the group consisting of polyaniline, polypyrrole, polythiophene, poly(phenylene sulfide), poly(p-phenylene), poly(phenylene vinylene), poly(furylene vinylene), poly(carbazole), poly(thienylene vinylene), polyacetylene, and poly(isothianaphthene) bonded to the polymer strand;

bonding the polymeric complex to a non-conductive polymer wherein the polymeric complex is complexed with the non-conductive polymer to form the coating, the polymeric complex having hydrophilic/hydrophobic regions that allow the coating to be water soluble prior to application of the coating onto a surface and water insoluble after the coating has been applied to the surface.

9. The method of claim 8 wherein the non-conductive polymer is selected from the group consisting of thermoset or thermoplastic resins.

10. The method of claim 9 wherein the resins are selected from the group consisting of epoxy, acrylic, alkyd, vinyl, urethane and olefinic resins.

11. The method of claim 8 wherein the non-conductive polymer is an epoxy and the method further comprises:

adding a curing agent to the coating selected from the group consisting of capped polyamines, polymercaptans and polyisocyanates to the coating.

12. The method of claim 8 wherein the non-conductive polymer is an epoxy resin and which further comprises:

adding a curing agent selected from the group consisting of polycarboxylic acids, polyanhydrides, polyphenols and carboxy-functional polyesters to the coating.

13. The method of claim 10 wherein the epoxy is a cationic epoxy resin.

14. The method of claim 10 wherein the polymeric complex is cross-linked to the epoxy resin.

15. A method of forming a protective coating on a metal surface comprising:

forming a protective coating on a metal surface by dispersing a water-borne polymeric complex comprising a strand of a -conjugated polymer selected from the group consisting of polyaniline, polypyrrole, polythiophene, poly(phenylene sulfide), poly(p-phenylene), poly(phenylene vinylene), poly(furylene vinylene), poly(carbazole), poly(thienylene vinylene), polyacetylene, and poly(isothianaphthene) and a polymer strand selected from the group consisting of poly(acrylic acid), poly(methacrylic acid), poly(vinylmethylether-co-maleic acid), poly(methylmethacrylate-co-acrylic acid), poly(ethylmethacrylate-co-acrylic acid) and poly(acrylamide-co-acrylic acid), the polymer strand being non-covalently bonded to the -conjugated polymer strand in an aqueous medium;

binding a cationic epoxy resin to the water-borne polymeric complex to form a cathodically charged complexed solution; and electrophoretically coating a metal with the cathodically charged complexed solution to form the protective coating, the water-borne polymeric complex having hydrophobic/hydrophilic regions configured to render the protective coating water insoluble.

16. The method of claim 15 wherein the metal is aluminum.

17. The method of claim 16 wherein the metal is steel.

18. The method of claim 15 wherein the polymeric complex is present in the protective coating in a range of between about greater than 1% to 6% by weight based upon the total weight of the protective coating.

19. The method of claim 15 which further comprises:

providing a net positive charge on the protective coating by controlling the ratio of polymeric complex to cationic epoxy resin in the cathodically charged solution.

20. An anti-corrosive coating which comprises:
a water-borne polymeric complex comprising a strand of a -conjugated polymer selected from the group consisting of polyaniline, polypyrrole, polythiophene, poly(phenylene sulfide), poly(p-phenylene), poly(phenylene vinylene), poly(furylene vinylene), poly(carbazole), poly(thienylene vinylene), polyacetylene, and poly(isothianaphthene);
a polymer strand, the polymer strand being non-covalently bonded to the -conjugated polymer strand; and a
non-conductive polymer, the non-conductive polymer being complexed with the water-borne polymeric complex, the water-borne polymeric complex having hydrophilic/hydrophobic regions configured to allow the coating to be water soluble prior to application of the coating onto a surface and water insoluble after the coating has been applied to the surface.

21. The composition according to claim 20 wherein the polymer strand comprises anionic and cationic functional groups.

22. The composition according to claim 21 wherein the polymer strand is selected from the group consisting of poly(acrylic acid), poly(methacrylic acid), poly(vinylmethylether-co-maleic acid), poly(methylmethacrylate-co-acrylic acid), poly(ethylmethacrylate-co-acrylic acid) and poly(acrylamide-co-acrylic acid).

23. The composition of claim 22 wherein the -conjugated polymer is polyaniline and the polymer strand is poly(methylmethacrylate-co-acrylic acid).

24. The composition of claim 23 wherein the cationic groups are methacrylate segments and the anionic groups are acrylic acid segments.

* * * * *

UNITED STATES PATENT AND TRADEMARK OFFICE
CERTIFICATE OF CORRECTION

PATENT NO. : 6,762,238 B1  Page 1 of 1
DATED : July 13, 2004
INVENTOR(S) : Sze Cheng Yang It is certified that error appears in the above-identified patent and that said Letters Patent is hereby corrected as shown below:

Title page,
Insert Item -- [60]  Related U.S. Application Data
    Provisional Application No. 60/110,612, filed on December 2, 1998. --.

Column 1,
Line 3, insert -- CROSS-REFERENCES TO RELATED APPLICATIONS
    This application, which is a National Stage of International
    Application No. PCT/US99/28307, filed on December 1, 1999,
    claims priority to U.S. Provisional Application No. 60/110,612,
    filed on December 2, 1998. --.

Column 20,
Line 60, insert -- $\pi$ -- before "-conjugated".

Column 21,
Line 5, insert -- $\pi$ -- before "-conjugated".
Line 67, delete "polymer" and insert -- polymeric --.

Column 22,
Line 46, insert -- $\pi$ -- before "-conjugated".

Column 23,
Line 11, insert -- $\pi$ -- before "-conjugated".

Signed and Sealed this

Twenty-first Day of March, 2006

JON W. DUDAS
*Director of the United States Patent and Trademark Office*